Figure 1:
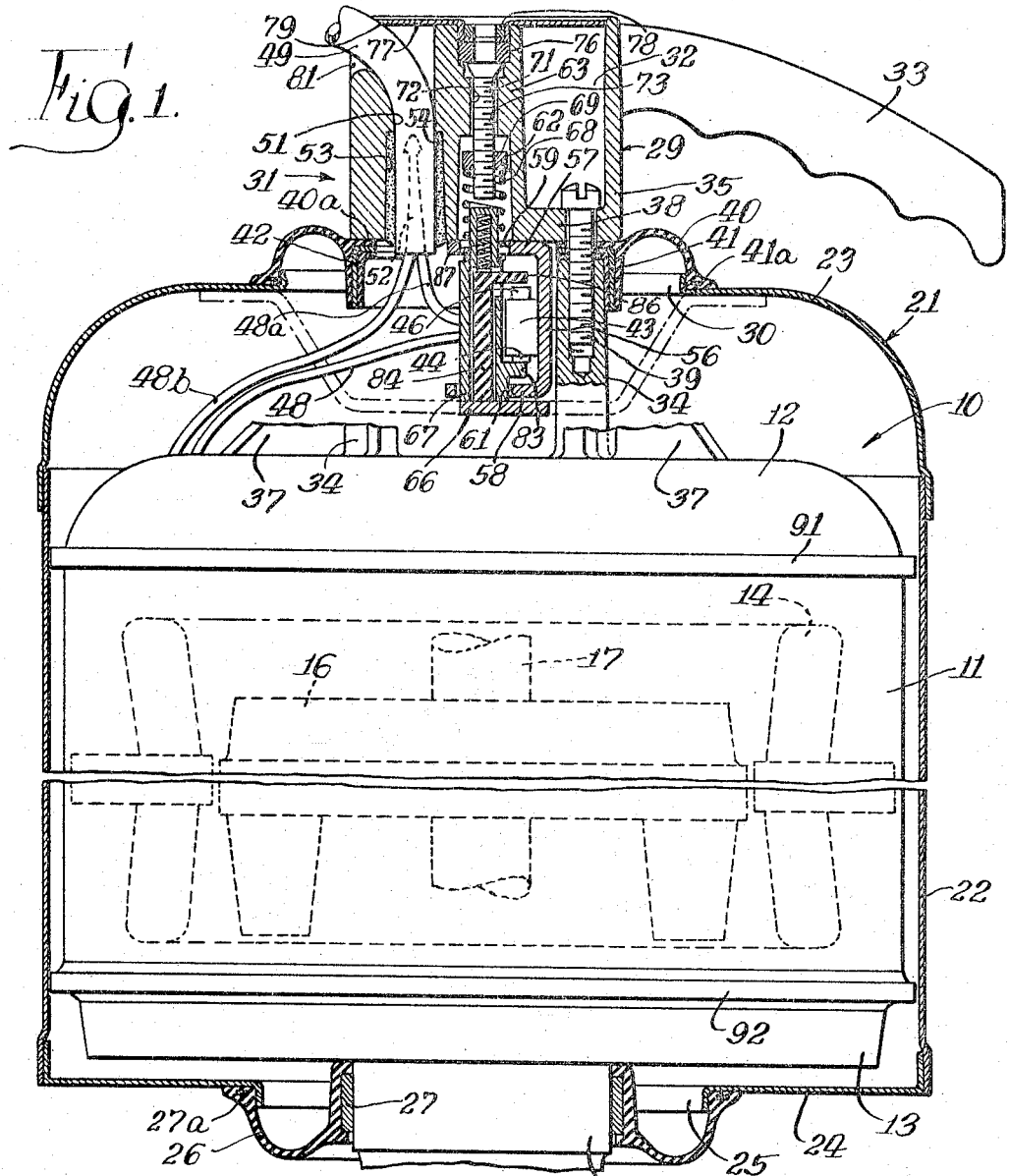

June 20, 1967  R. A. DOUBLE  3,327,144
CARRYING HANDLE AND SWITCH ASSEMBLY FOR A SUBMERSIBLE MOTOR
Filed July 15, 1964

INVENTOR.
Raymond A. Double
BY
Hibben, Noyes & Bicknell
Attys.

United States Patent Office 3,327,144
Patented June 20, 1967

3,327,144
CARRYING HANDLE AND SWITCH ASSEMBLY
FOR A SUBMERSIBLE MOTOR
Raymond A. Double, Bluffton, Ind., assignor to Franklin Electric Co., Inc., Bluffton, Ind., a corporation of Indiana
Filed July 15, 1964, Ser. No. 382,720
5 Claims. (Cl. 310—87)

This invention relates to submersible motors, and more particularly to a motor having a combination carrying handle and switch assembly.

A submersible motor adapted to be connected to drive a sump pump, for example, may be provided with an on-off control switch for the motor, and a float connected to actuate the switch. The switch is mounted at a position where it is protected against contact by liquid, and the float is connected to actuate the switch in response to changes in liquid level. To protect the motor and the switch against contact by liquid, the float has preferably been constructed to form a liquid tight enclosure, and the motor and the switch have been mounted within the enclosure formed by the float.

Some difficulty has been encountered with this construction when servicing or replacement of the switch is required. This is due to the fact that considerable time and effort are required to dismantle the float in order to get at the switch.

Accordingly, it is an object of this invention to provide a submersible motor including a float and a switch wherein the switch is mounted within a liquid tight enclosure formed by the float and yet is readily accessible for servicing or replacement.

A further object is to provide a motor of the foregoing character, having a removable assembly comprising the aforesaid switch and a handle for carrying the motor.

It is another object to provide a novel carrying handle and switch assembly for a submersible motor.

Figure 2:
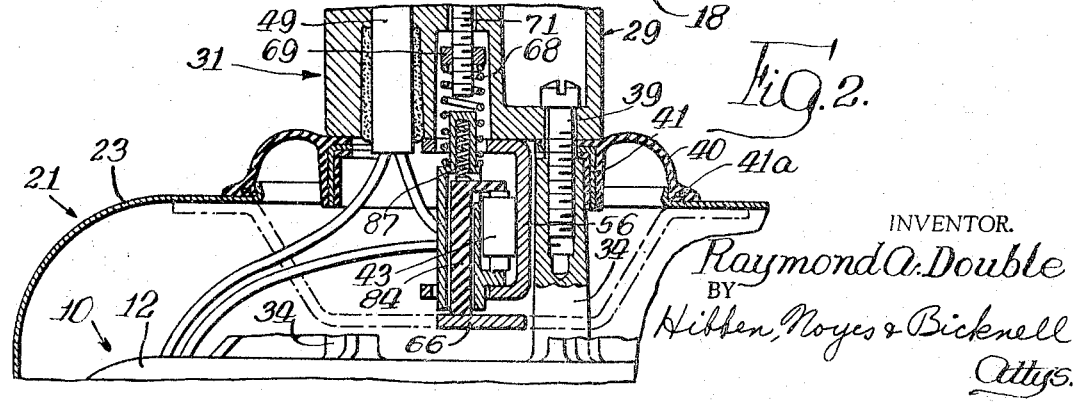

Other objects and advantages of the invention will become apparent from the following description taken in conjunction with the accompanying figures of the drawing, in which:

FIG. 1 is a view partially in section of a submersible motor construction embodying the invention and including a carrying handle and switch assembly; and FIG. 2 is a fragmentary sectional view of a portion of the structure shown in FIG. 1; but showing a different position of parts of the structure.

In general, a submersible motor embodying the invention comprises a motor having a housing member, a float member, and a carrying handle and switch assembly. The handle and switch assembly is adapted to be connected to the housing member and the switch is adapted to be positioned within a liquid tight enclosure formed by one of the float and housing members. Further, the float member is connected to the housing member and to the assembly such that movement of the float member relative to the motor and to the assembly is permitted, and such relative movement of the float member actuates the switch. The construction and method of attachment of the various parts is such that the assembly including the switch may be easily disconnected from the motor and from the float member for servicing.

The construction shown in FIG. 1 comprises an electric motor 10 of a conventional design including a housing having a cylindrical central portion 11 and upper and lower end bells 12 and 13, the portions 11, 12 and 13 of the housing being secured together by any desired means. A stator assembly 14 is secured within the central portion 11 of the housing, and a rotor assembly 16 including a shaft 17 is positioned within the stator assembly 14. The shaft 17 is journaled in the upper and lower end bells 12 and 13 in a conventional manner, and it extends downwardly through a cylindrical hub 18 of the lower end bell 13 for attachment with a pump (not shown) below the motor, a seal being provided between the shaft 17 and hub 18.

A liquid tight enclosure around the motor 10 is formed by a shell or float 21 comprising a generally cylindrical central portion 22 and upper and lower end portions 23 and 24. The portions 22, 23 and 24 of the float are preferably made of sheet metal, such as bronze, and are secured together as by soldering. The lower end portion 24 has an opening 25 formed in it through which the hub 18 and the shaft 17 extend, and the end portion 24 is connected to the hub 18 by means of a flexible diaphragm 26 made of a material such as rubber, and an annular metallic band 27. The band 27 tightly engages the outer periphery of the hub 18 and the diaphragm 26 is preferably secured to both the band 27 and to the margin of the opening 25 in the lower end portion 24, thereby providing a liquid tight connection between the lower end portion 24 of the float 21 and the motor 10. A reinforcing ring 27a may be embedded in the portion of the diaphragm 26 adjacent the opening 25 to strengthen this portion of the diaphragm.

At the upper end of the motor, a carrying handle and switch assembly 31 extends through an opening 30 in the upper end portion 23 of the float 21 and is secured to the upper end bell 12 of the motor housing. The assembly 31 comprises a handle structure 29 which includes a generally cylindrical hub portion 32 and a handle portion 33, the handle portion 33 preferably being formed integrally with the hub portion 32 and extending radially outward so that it may be grasped for carrying purposes.

The hub 32 is positioned above the upper end bell 12 of the motor and is preferably coaxial therewith. For the purpose of securing the hub 32 to the motor housing, a plurality of upwardly extending bosses 34 are formed on the upper end bell 12, each boss 34 having an internally threaded hole at its upper end. The bosses 34 may be equidistant from the axis of the end bell 12 and may be spaced equal angular distances apart. Ribs 37 extending from the bosses 34 to the top surface of the end bell 12 are preferably provided to strengthen the bosses.

The hub 32 includes a cylindrical outer wall 35 and a bottom wall 38. The bottom wall 38 has a hole aligned with each of the bosses 34, and bolts 39 extend through these holes and are threaded into the bosses 34 in order to secure the hub 32 to the motor housing. To provide a liquid tight connection between the hub 32 and the float 21, a flexible diaphragm 40 is provided which, at its outer periphery, is secured to the margin of the opening 30 in the upper end portion 23 of the float. The connection between the diaphragm 40 and the upper end portion 23 is made liquid tight, and a reinforcing ring 41a may be embedded in the portion of the diaphragm 40 adjacent the margin of the opening 30 to strengthen this portion. At its inner periphery, the diaphragm 40 is secured to and embraces the outer surface of a rigid ring 41 and has a lip 40a overlying an inwardly extending upper flange 42 (FIGS. 1 and 4) of the ring 41. The outer diameter of the ring 41 is substantially equal to that of the hub 32, and the lip 40a is interposed between the upper surface of the flange 42 and the underside of the hub 32. At the locations of the bosses 34, the width of the flange 42 is increased sufficiently to extend inwardly over the top of the bosses 34, and holes are formed in the flange 42 and the lip 40a through which the bolts 39 extend. Thus, when the bolts 39 are tightened into the bosses 34, the lip 40a of the diaphragm 40 on the upper surface of the flange 42 of the ring 41 is clamped between the flange 42 and the bottom wall 38 of the hub 32, thereby providing a liquid tight seal between the hub 32 and the float 21.

The carrying handle and switch assembly 31 further comprises an on-off motor control switch 43 which is adapted to be actuated by movement of the float 21 and which is secured to the hub 32 and is positioned within the enclosure formed by the float 21. The switch 43 includes internal switch contacts (not shown), an on button 44 which extends downwardly from the main body of the switch 43 and an off button 46 which extends upwardly from the main body of the switch. The construction of the switch is such that the switch contacts are closed by pushing the on button 44 and opened by pushing the off button 46 and after one of the buttons 44 and 46 is pushed to move the contacts to one of the open and closed positions, the contacts will remain in that position even though pressure on the pressed button is removed, until the other button is pressed to move the contacts to the other position. One contact of the switch 43 is connected to the windings of the motor 10 by a conductor 48 and another contact is connected to a conductor 48a which is part of an electric power cord 49, the connections at the switch being such that a direct connection is made between the conductors 48 and 48a when the switch contacts are closed. Another conductor 48b runs from the power cord 49 directly to the windings of the motor. Still another conductor may be provided to ground the apparatus. It will be understood that when the cord 49 is plugged into a suitable electric outlet and the contacts of the switch are closed, power is connected to the windings of the motor 10. From the switch 43, the power cord 49 extends upwardly through an opening 51 formed through the hub 32. To prevent the cord 49 from moving relative to the hub 32, an anchor pin 52 may be forced into the center of the cord 49, and a portion of the opening 51 around the cord 49 may be recessed as at 53 and an epoxy and hardener composition 54 poured into the recess around the cord.

To secure the switch 43 to the hub 32, a U-shaped bracket 56 is provided having upper and lower arms 57 and 58, respectively provided with holes 59 and 61. The upper arm 57 is rigidly secured by conventional means to the bottom surface of the wall 38 with the holes 59 and 61 axially aligned with a vertically extending hole 62 formed through a centrally located post 63 of the hub 32. The switch 43 is secured to the intermediate portion of the bracket 56 substantially midway between the arms 57 and 58, and to one side of the axis of the holes 59 and 61.

To move the switch 43 from its off position to its on position when the float 21 rises relative to the motor 10, a bow-shaped float bracket 66 is positioned with its center portion underneath the axis of the holes 59 and 61 and with its ends extending upwardly and outwardly, the ends of the bracket 66 being secured to the inner surface of the upper end portion 23 of the float 21. The bracket 66 actually extends perpendicularly to the planes of the sections shown in the drawings, but is illustrated in dash and dot lines in a position turned 90° from its true position to show its shape. A tubular plunger 67 extends through the holes 59 and 61 of the bracket 59 and is movable relative to the bracket, and a compression spring 68 urges the plunger 67 downwardly. The spring 68 is positioned around the upper end portion of the plunger 67, which portion has a reduced diameter and which extends upwardly into the hole 62 of the post 63, and is engaged at its upper end by an adjusting nut 69 which is threaded on an adjusting screw 71. The opening 62 and the nut 69 are preferably made with an out-of-round cross section, preferably a square, so that the nut 69 cannot rotate relative to the hub 32.

Above the nut 69, an inwardly extending ledge 72 is formed within the opening 62 of the post 63, the ledge 72 thereby forming a reduced area portion 73 of the opening 62. The adjusting screw 71 is positioned with its head above the ledge 72 and its shank extending through the reduced area portion 73.

The adjusting screw 71 is held against axial movement relative to the hub 32 by means comprising a resilient washer 76 which is pressed into the opening 62 and into engagement with the upper surface of the head of the screw 71. The washer 76 is substantially coaxial with the screw 71 and a hole at the center of the washer 76 is sufficiently large that a screwdriver may be inserted through it in order to turn the screw 71. The washer 76 is held in place by a circular top enclosing cap 77 which may be positioned on the upper end of the hub 32. The center of the cap 77 has a hole formed in it coaxial with the screw 71 and the portion of the cap 77 around the periphery of the hole is tightly pressed into the upper end of the opening 62 and retained therein by a pressed-in washer 78. Thus, the screw 71 is prevented from moving axially upward relative to the hub 32 by the washer 76, but nevertheless, the head of the screw 71 is accessible to a screwdriver through the holes in these members. Of course, downward axial movement of the screw 71 is prevented by the ledge 72. The washer 76, being pressed tightly in the post 63 and against the head of the screw 71, provides a liquid tight connection to prevent liquid from leaking into the float enclosure through the opening 62.

The cap 77 is generally circular and covers the space within the outer wall 35 of the hub 32. A slot 79 is preferably formed in the cap 77 for the power cord 49. Further, the outer wall 35 of the hub 32 adjacent the slot 79 may be provided with a downwardly extending recess 81 to permit the cord 49 to extend laterally from the hub 32.

Thus, the bracket 66 is designed to lift the plunger 67 upwardly upon upward movement of the float 21 against the force of the compression spring 68, and the amount of force required to raise the plunger 67 may be adjusted by turning the screw 71.

An arm 83 formed on one side of the plunger 67 extends between the on button 44 and the lower arm 58 of the bracket 56. The off button 46 may be actuated by an inner plunger 84 positioned within the outer plunger 67, and having an arm 86 extending through a slot formed in the wall of the outer plunger 67 and over the off button 46. The inner plunger 84 is axially movable relative to the outer plunger 67, and it is urged downwardly by a second compression spring 87. The upper end of the tubular outer plunger 67 is closed, and the spring 87 is positioned between this closed end and the top surface of the inner plunger 84. The lower end of the outer plunger 67 is open and therefore the lower end of the inner plunger 84 may also rest on the bracket 66.

When constructed as described and shown, the float 21 forms an air and liquid tight enclosure around the motor 10 and the switch 43. Limited axial movement of the float 21 relative to the motor 10 is permitted, however, due to the flexibility of the two diaphragms 26 and 40. Circular ridges 91 and 92 may be formed on the motor housing, which slidingly engage the inner surface of the float 21 and guide its axial movement.

Assume that the structure disclosed is positioned in a sump and that the lower end of the motor shaft 17 is connected to a pump. Assume also that the liquid level in the sump is relatively high and, consequently, the float 21 is in a raised position relative to the motor 10. The bracket 66 which is attached to the float 21 is then also in a raised position relative to the switch 43 which is attached to the motor 10. In this position, shown in FIG. 1, the plungers 67 and 84 are raised by the bracket 66 sufficiently high that the arm 83 actuates the on button 44 and actuates the switch 43, and consequently energizes the motor 10.

When the motor 10 is on, the pump is driven and gradually lowers the liquid level in the sump. The float 21, carrying the bracket 66, lowers with the liquid level, and the plungers 67 and 84 follow the bracket 66 due to the springs 68 and 87. The arm 83 of the outer plunger 67 eventually engages the arm 58 of the bracket 56 and stops moving downwardly but the inner plunger 84 and the arm 86 continue to move downwardly with the bracket 66. After the arm 83 of the plunger 67 engages the bracket 56, the spring 68 no longer forces the float 21 downwardly and the buoyancy of the float 21 is balanced only by its weight and by the force of the spring 87, which force is preferably less than the amount of force exerted by the other spring 68. Accordingly, at this position there is a change in liquid level relative to the float 21 before the float 21 continues its downward movement with the liquid level. At a certain liquid level the float 21 again moves downwardly and at a certain lower position of the float 21, the force of the spring 87 urging the arm 86 against the off button 46 is able to actuate the switch and deenergize the motor. This position is shown in FIG. 2.

Thereafter, if the liquid in the sump again gradually rises, the float 21 and the bracket 66 also rise due to the buoyancy of the float 21. At first, the buoyancy of the float is balanced only by its own weight and the force of the spring 87. When the bracket 66 engages the outer plunger 67, the upward movement of the float 21 stops momentarily until the water level rises relative to the float to the point where the buoyancy of the float 21 is also able to overcome the force of the spring 68. Both plungers 67 and 84 then rise with the bracket 66 until the arm 83 engages the on button 44 and actuates the switch 43 and energize the motor 10.

The liquid level at which the switch 43 is turned on is determined by the force of the spring 68 and may be adjusted by turning the screw 71. The level at which the switch 43 is turned off is determined by the force of the other spring 87 and is not adjustable. It is preferred that the spring rate of spring 87 be low as compared to the rate of the spring 68 so that a differential in water level between the on and off points may be obtained with reliability and accuracy, and in a limited space.

In the event servicing or replacement of the switch 43 is required, the washer 78 and the cap 77 are pried loose from the hub 32 and the three bolts 39 are then removed. The handle and the switch may thereafter be lifted upwardly through the opening formed by the ring 41. The wires 48 and 48b connecting the assembly to the motor 10 should of course be long enough to permit the entire switch 43 to be taken out of the float 21. After servicing or replacement of the switch 43, the switch 43 may be re-inserted into the float enclosure, and the bolts 39, the cap 77 and the washer 78 replaced. The bracket 66 remains within the float of course while the swtch is being serviced, and the plungers 67 and 84 are held in place by the bracket 56.

The foregoing construction is advantageous because the switch may be removed for servicing with a minimum of time and effort. Nevertheless, the switch is protected within a liquid tight enclosure and it readily responds to a change in the position of the float. Further, it is not necessary to dismantle the float to make the switch accessible for servicing.

I claim:
1. In combination,
   an electric motor,
   a carrying handle removably attached to said motor,
   a two position control switch for said motor attached to said handle and including means for holding said switch in one of its positions until actuated to the other of its positions,
   a float enclosing said motor and said switch, having a flexible connection with said motor for permitting limited movement of said float relative to said motor, and
   means on said float for actuating said switch upon movement of said float.

2. In a motor driven sump pump the combination of,
   an electric motor having a housing member,
   at least one outwardly extending boss formed on said housing member,
   a carrying handle removably but rigidly attached to said boss in spaced relation to said housing member,
   an on-off control switch for said motor rigidly attached to said handle and positioned in the space defined between said housing and said handle,
   a float member positioned around said housing member and said switch,
   first and second flexible diaphragm means removably attached, respectively, between said float member and said housing member and between said float member and said carrying handle, to complete a liquid tight enclosure around said motor and said control switch, and
   means attached to said float member for actuating said switch upon movement of said float relative to said motor.

3. In combination,
   an electric motor,
   a carrying handle removably attached to said motor,
   a two position control switch for said motor attached to said handle and including means for holding said switch in one of its positions until actuated to the other of its positions,
   a float enclosing said motor and said switch, having a flexible connection with said motor for permitting limited movement of said float relative to said motor, and
   means on said float for actuating said switch upon movement of said float, comprising,
   a bracket secured to said float and extending adjacent said switch,
   plunger means movably mounted in said handle engaging said bracket, for actuating said switch between its two positions, and
   main biasing means between said handle and said plunger means for urging said plunger means toward said bracket,
   whereby an upward change in the level of liquid around said float will cause a corresponding movement of said float and bracket to move said plunger means and actuate said switch to one of its positions, and
   a downward change in the level of liquid around said float will allow a corresponding movement of said float and bracket to permit said main biasing means to move said plunger means and actuate said switch to the other of its positions.

4. The combination of claim 3 wherein said two position control switch includes separate on and off buttons, and
   said plunger means comprises
   an outer plunger means to engage said on button upon upward movement of said float and said bracket,
   an inner plunger means movably mounted within said outer plunger means to engage said off button downward movement of said float and said bracket, and
   secondary biasing means mounted between said inner and outer plunger means for urging said inner plunger means toward said bracket relative to said outer plunger means.

5. The combination of claim 4 wherein
said main biasing means comprises a relatively strong main spring,
said secondary biasing means comprises a weaker secondary spring, and
said handle includes means for limiting the range of downward movement of said outer plunger means, whereby a substantial difference is defined between the water level necessary to turn said switch on and the water level necessary to turn said switch off.

References Cited

UNITED STATES PATENTS

| 2,625,107 | 1/1953 | Schaefer | 310—87 |
| 2,662,206 | 12/1953 | Schaefer | 310—87 |
| 2,704,346 | 3/1955 | Schaefer | 310—87 |

MILTON O. HIRSHFIELD, *Primary Examiner.*

J. W. GIBBS, *Assistant Examiner.*